Aug. 18, 1959
W. ENGELS
2,899,718
DOOR BUMPERS
Filed March 6, 1958
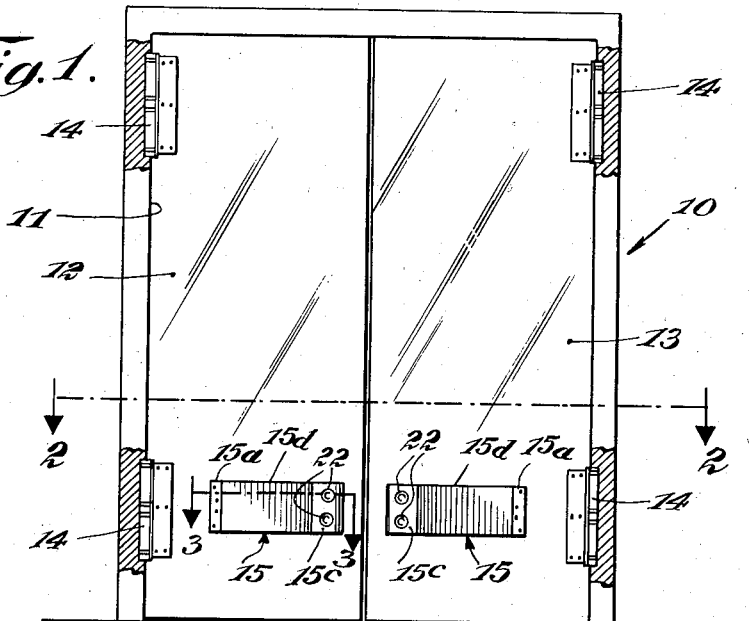
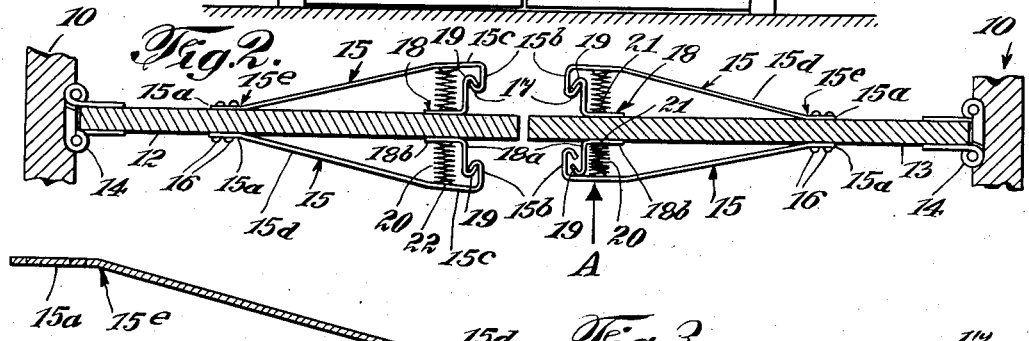
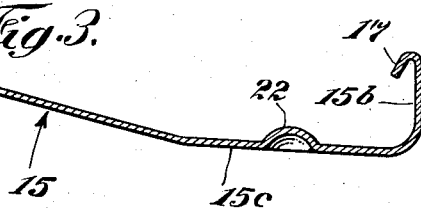
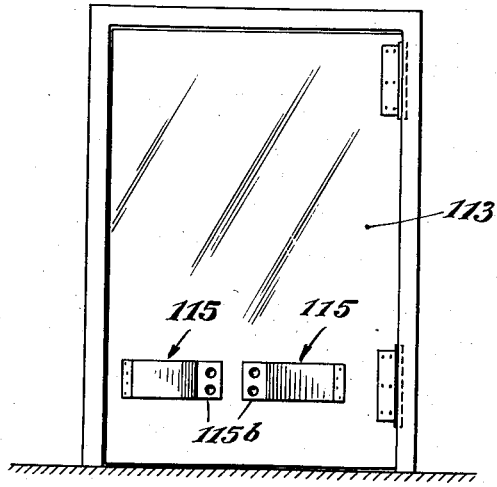
INVENTOR
Walter Engels
BY C. P. Goepel
his ATTORNEY United States Patent Office 2,899,718
Patented Aug. 18, 1959

2,899,718
DOOR BUMPERS

Walter Engels, Tryon, N.C., assignor to Bommer Spring Hinge Co. Inc., Landrum, S.C., a corporation of New York Application March 6, 1958, Serial No. 719,625

3 Claims. (Cl. 20—16)

The present invention relates to improvements in door bumpers for swinging doors.

An object of the invention is to provide an improved door bumper for swinging doors which is so constructed as to control and limit the movement of the bumper plate in a direction away from the door panel and to thus prevent its breakage.

Another object of the invention is to provide a door bumper of the above character whose bumper plate is at least partly transverse to the direction of movement of an oncoming vehicle.

An additional object of the invention is to provide a door bumper for swinging doors whose bumper plate is under constant tension generated by at least two resilient elements.

A further object of the invention is to provide a door bumper whose springs are so mounted as to be removable without requiring removal or disconnection of other elements of the structure.

The invention resides essentially in the provision of a bumper plate, means for mounting the plate on a swinging door panel in horizontal position, and resilient elements for constantly urging the bumper plate away from the door panel. One end of the bumper plate is rigidly fixed to the door panel while its other end has a limited freedom of movement with respect to the adjacent major surface of the panel. The extent of movement of the bumper plate in a direction away from the panel is controlled by a bracket whose hook-shaped end engages with a complementary hook forming part of the bumper plate. The movement of the bumper plate toward the door panel depends upon the tension of at least one but preferably two coil springs removably mounted between the bracket and the free end of the plate. In this manner, the coil spring or springs can expand only to the extent permitted by the interengaging hooks of the bracket and the bumper plate, respectively, and the fixed end of the latter is subjected to lesser stresses when returning into its idle position. The springs are held in position between aligned protuberances on the bracket and the bumper plate, and may thus be removed without removing other elements of the novel device.

The bumper plates may be mounted singly or in pairs on one or both sides of the swinging door panel and are of such width and at such distance from the floor as to be in the path of the bumper of a vehicle, be it a truck, a dolly or any other wheel-mounted contrivance which passes through the swinging doors.

A zone of the bumper plate adjacent to its free end is substantially parallel with the door panel so as to provide for more than a mere point contact with the bumper of a passing vehicle.

Other features, advantages and attributes of the novel assembly will become apparent in the course of the following detailed description of two embodiments selected for illustration in the accompanying drawings, and the invention will be finally pointed out in the appended claims.

In the drawings,

Fig. 1 is a front view of a swinging door with two door panels, each side of the panels having a bumper plate affixed thereto;

Fig. 2 is an enlarged horizontal section taken on line 2—2 of Fig. 1;

Fig. 3 is an enlarged longitudinal section through a bumper plate taken on line 3—3 of Fig. 1; and Fig. 4 illustrates a swinging door with a single panel having a pair of bumper plates fixed to each of its major surfaces.

Referring first to Figs. 1 and 2, there is shown a door frame 10 of usual construction defining a rectangular opening 11 normally closed by a pair of swinging door panels 12, 13 articulately connected to the upright members of frame 10 by spring hinges 14 of known construction.

Each of door panels 12, 13 supports a pair of bumper plates 15 made of a resilient metallic material and mounted thereon in mirror reverse, each plate 15 being of such width and at such distance above the floor as to be in the path of bumpers of the vehicles normally passing through the swinging doors. The end zone 15a of each bumper plate is rigidly fixed to the panel 12 or 13 by a number of screws or rivets 16. Each bent-over portion 15b of plates 15 defines a hook 17 which engages with the hook-shaped end 19 forming part of one leg 18a of an L-shaped bracket 18 whose other leg 18b is rigidly fixed to the door panels 12, 13 in any suitable way (not shown). Two coil springs 20 are disposed between the leg 18b of each bracket 18 and the adjacent zone 15c of each bumper plate, the extremities of the springs being held in desired position by respective convex protuberances 21, 22 on the legs 18b of brackets 18 and on the zones 15c of the bumper plates. The zone 15d of each bumper plate 15 diverges from the adjacent surface of door panel 12 or 13 in a direction from elements 16 toward the bent-over end portions 15b.

As is best shown in Fig. 2, coil springs 20 urge the free ends 15b and hooks 17 of bumper plates 15 in a direction away from their door panels 12 or 13 to the extent permitted by hooks 17, 19 which, depending on the length of legs 18a of the brackets and on the length of bent-over portions 15b of the bumper plates, engage with one another to maintain springs 20 under a certain tension and to reduce the stresses on portions 15e of the bumper plates which are repeatedly subjected to stresses when the bumper plates are engaged by passing vehicles. The lower right-hand plate 15 in Fig. 2 is shown slightly moved from its idle position by a force acting in the direction of arrow A.

By providing more than one coil spring 20, the bumper plates 15 are subjected to lesser torsional stresses and the protuberances 21, 22 in brackets 18 and plates 15 replace the customary pins which would necessitate the provision of registering openings in the door panels proper. Moreover, a damaged spring which, as shown, is merely held between protuberances 21, 22 but is not fixed to the door panel or to other parts of the door bumper, may be conveniently replaced without requiring removal of brackets 18 or the bumper plates.

Fig. 4 shows a modified arrangement in which two bumper plates 115 are fixed to each major surface of the door panel 113. Portions 115b of the bumper plates are parallel with the plane of the door panel and thus reduce the sliding contact with the bumper of an oncoming vehicle. Plates 115 are mounted on the door panel 113 in a manner analogous with that described in connection with Figs. 1 and 2 and their design is identical with that of elements 15 as illustrated in Fig. 3.

Various modifications of the assembly hereinabove described will occur to men skilled in the art within the purview of my invention and I, therefore, desire to be limited only by the scope of the appended claims.

What I claim and desire to protect by Letters Patent is:

1. In combination with a swinging door panel having two major surfaces, at least one door bumper attached to at least one of said major surfaces, said bumper comprising an elongated plate having a first longitudinal end rigidly fixed to the door panel and a second longitudinal end horizontally aligned with said first end and bent in a substantially vertical plane at right angles to the plane of the door panel, said second longitudinal end having a free edge defining a hook, the plate having a portion between said longitudinal ends which diverges from the adjacent major surface of said panel in a direction from said first longitudinal end toward said second longitudinal end and a zone of said portion adjacent to said second longitudinal end being substantially parallel with the plane of the panel, an L-shaped bracket having a first leg fixed to the door panel adjacent to said second longitudinal end and a second leg extending in a vertical plane substantially at right angles to the adjacent major surface of the panel, said second leg having a free vertical edge defining a second hook in the path of said first mentioned hook, and resilient means removably inserted between said first leg and said zone for constantly urging said second longitudinal end away from the door panel whereby said hooks engage with one another and limit the extent of movement of said second longitudinal end away from the door panel.

2. In combination with a swinging door panel having two major surfaces, at least one door bumper attached to at least one of said major surfaces, said bumper comprising an elongated, resilient, substantially rectangular plate of metallic material having a first longitudinal end rigidly fixed to the door panel and a second longitudinal end horizontally aligned with said first longitudinal end and bent in a substantially vertical plane at right angles to the plane of the door panel, said second longitudinal end having a free edge defining a hook, a bracket fixed to the door panel adjacent to said second longitudinal end and defining a second hook in the path of said first mentioned hook, and at least one coil spring removably inserted between said panel and said plate adjacent to said second longitudinal end for constantly urging the latter away from the door panel whereby said hooks engage with one another and limit the extent of movement of said second longitudinal end away from the door panel and maintain said coil spring in compressed condition.

3. In combination with a swinging door panel having two major surfaces, at least one door bumper attached to at least one of said major surfaces, said bumper comprising an elongated substantially rectangular plate of metallic material having a first longitudinal end rigidly fixed to the door panel and a second longitudinal end horizontally aligned with said first longitudinal end and bent in a substantially vertical plane at right angles to the plane of the door panel, said second longitudinal end having a free edge defining a hook, the plate having a portion between said longitudinal ends which diverges from the adjacent major surface of the panel in a direction from said first toward said second longitudinal end and said portion having a zone immediately adjacent to said second longitudinal end which is substantially parallel with the plane of said panel, a substantially L-shaped bracket having a first leg fixed to the door panel adjacent to said second longitudinal end and a second leg extending in a vertical plane substantially at right angles to the plane of the panel, said second leg having a free vertical edge defining a second hook in the path of said first mentioned hook, and at least two substantially vertically aligned coil springs disposed between said first leg and said zone for constantly urging said second longitudinal end away from the door panel whereby said hooks engage with one another and limit the extent of movement of said second longitudinal end away from the door panel, said zone and said first leg having a plurality of substantially vertically aligned protuberances for seating the respective extremities of said coil springs.

References Cited in the file of this patent

UNITED STATES PATENTS

| | | |
|---|---|---|
| 1,776,005 | Miller | Sept. 16, 1930 |
| 2,593,403 | Bailey | Apr. 22, 1952 |
| 2,677,861 | Friedman | May 11, 1954 |